United States Patent [19]
Fennern

[11] Patent Number: 5,162,097
[45] Date of Patent: Nov. 10, 1992

[54] STEAM COOLED NUCLEAR REACTOR WITH BI-LEVEL CORE

[75] Inventor: Larry E. Fennern, San Jose, Calif.

[73] Assignee: General Electric Company, San Jose, Calif.

[21] Appl. No.: 681,246

[22] Filed: Apr. 4, 1991

Related U.S. Application Data

[63] Continuation-in-part of Ser. No. 553,073, Jul. 10, 1990.

[51] Int. Cl.$^5$ .............................................. G21C 5/18
[52] U.S. Cl. .................................... 376/433; 376/370; 376/267; 376/917
[58] Field of Search ............... 376/433, 370, 428, 435, 376/917, 267

[56] References Cited

U.S. PATENT DOCUMENTS

| | | | |
|---|---|---|---|
| 3,206,372 | 9/1965 | Kluge et al. | 376/370 |
| 3,284,310 | 11/1966 | Straat | 376/433 |
| 4,326,922 | 4/1982 | Ferrari et al. | 376/435 |

OTHER PUBLICATIONS

M. A. Schultz et al, "A New Steam–Cooled Reactor", Nuclear Science and Engineering, 1985, pp. 391–399.

Y. Ishiguro et al, "Pancake Core High Conversion Light Water Reactor Concept," Nuclear Technology, vol. 84, Mar. 1989, pp. 331–343.

P. N. Alekseev et al, "Steam–Water Power Reactor Concept," Reference and date unknown, pp. 6-1 through 6-17.

Wilkins et al, *Advanced BWR: Design Improvements Build on Proven Technology*, Nuclear Engineering International, reprint Jun. 1986, pp. 1–7 and drawing entitled "The World's Reactors No 89".

Foster et al, "Basic Nuclear Engineering," 1977, cover and copyright pages, and pp. 427–488.

*Primary Examiner*—Brooks H. Hunt
*Assistant Examiner*—Frederick H. Voss
*Attorney, Agent, or Firm*—Robert R. Schroeder

[57] ABSTRACT

In accordance with the present invention, a nuclear reactor with a recirculating heat transfer fluid has a bi-level core which provides enhanced flexibility in fuel arrangement. The bi-level core includes two sets of fuel units, one set arranged on a first level, the other set arranged on a second level. Preferably, fuel units of the second level are arranged in vertical alignment with fuel units of the first level. This permits a fuel unit of the first level to be accessed by removing only the adjacent fuel unit of the second level. During refueling operations, fuel units can be shifted from one level to the other, providing additional flexibility in arranging units at various stages of burnup. Preferably, fuel units of the first level are inverted relative to the fuel units of the second level. The inversion provides for placing plenum sections of fuel rods in different levels away from each other so that the plenums do not introduce a discontinuity in neutron generation, and allows for more uniform axial fuel burnup. The bi-level core allows fuel to be initially positioned in the second level for conversion of fertile fuel to fissile fuel, and then repositioned to the first level for more complete axial burnup. In a preferred embodiment the first level boils water to generate saturated steam, and the second level is cooled by the saturated steam and generates superheated steam.

20 Claims, 7 Drawing Sheets

STEAM COOLED NUCLEAR REACTOR WITH BI-LEVEL CORE

This is a continuation-in-part of application Ser. No. 07/553,073 filed Jul. 10, 1990.

TECHNICAL FIELD

This invention relates generally to nuclear reactors, and, more particularly, to a reactor having improved fuel arrangements in a reactor core.

BACKGROUND ART

Fission reactors rely on fissioning of fissile atoms such as uranium isotopes ($U^{233}$, $U^{235}$) and plutonium isotopes ($Pu^{239}$, $Pu^{241}$). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in modular units. These units can be bundles of vertically extending fuel rods. Each rod has a cladding which encloses a stack of fissile fuel pellets. Generally, each rod includes a space or "plenum" for accumulating gaseous byproducts of fission reactions which might otherwise unacceptably pressurize the rod and lead to its rupture. The bundles are arranged in a two-dimensional array in the reactor to form a "core". Neutron-absorbing control rods are inserted between or within fuel bundles to control the reactivity of the core. The reactivity of the core can be adjusted by incremental insertions and withdrawals of the control rods.

Both economic and safety considerations favor improved fuel utilization, which can mean less frequent refueling and less exposure to radiation from a reactor interior. In addition, improved fuel utilization generally implies more complete fuel "burnups", or fissioning.

A major obstacle to obtaining long fuel element lifetimes and complete fuel burnups is the inhomogeneities of the neutron flux both radially and axially throughout the core. For example, fuel bundles near the center of the core are surrounded by other fuel elements. Accordingly, the neutron flux at these central fuel bundles exceeds the neutron flux at peripheral fuel bundles which have one or more sides facing away from the rest of the fuel elements. Therefore, peripheral fuel bundles tend to burn up more slowly than do the more central fuel bundles.

The problem of flux density variations with radial core position has been addressed by repositioning fuel bundles between central and peripheral positions. This results in extended fuel bundle lifetimes at the expense of additional refueling operations.

Variations in neutron flux density occur in the axial direction as well as the radial direction. For example, fuel near the top or bottom of a fuel bundle is subjected to less neutron flux than is fuel located midway up a fuel bundle. These axial variations are not effectively addressed by radial redistribution of fuel elements.

In addition to the variations in neutron flux density, variations in spectral distribution affect burnup. For example, in a boiling-water reactor (BWR), neutrons released during fissioning move too quickly and have too high an energy to readily induce the further fissioning required to sustain a chain reaction. These high energy neutrons are known as "fast" neutrons. Slower neutrons, referred to ask "thermal neutrons", most readily induce fission.

In BWRs, thermal neutrons are formerly fast neutrons that have been slowly primarily through collisions with hydrogen atoms in the water (moderator) used as the heat transfer medium. Between the energy levels of thermal and fast neutrons are "epi-thermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile $U^{238}$ to fissile $Pu^{239}$. Within a core, the percentages of thermal, epithermal and fast neutrons vary over the axial extent of the core.

Axial variations in neutron spectra are caused in part by variations in the density or void fraction of the water flowing up the core. In a boiling-water reactor (BWR), water entering the bottom of a core is essentially completely in the liquid phase. Water flowing up through the core boils, so most of the volume of water exiting the top of the core is in the vapor phase, i.e., steam. Steam is less effective than liquid water as a neutron moderator due to the lower density of the vapor phase. Therefore, from the point of view of neutron moderation, core volumes occupied by steam are considered "voids"; the amount of steam at any spatial region in the core can be characterized by a "void fraction". Within a fuel bundle, the void fraction can vary from about zero at the base to about 0.7 near the top.

Continuing the example for the BWR, near the bottom of a fuel bundle, neutron generation and density are relatively low, but the percentage of thermal neutrons is high because of the moderation provided by the low void fraction water at that level. Higher up, neutron density reaches its maximum, while void fraction continues to climb. Thus, the density of thermal neutrons peaks somewhere near the lower-middle level of the bundle. Above this level, neutron density remains roughly stable while the percentages of epithermal and fast neutrons increase. Near the top of the bundle, neutron density decreases across the spectrum since there are no neutrons being generated just above the top of the bundle.

The inhomogeneities induced by this spectral distribution can cause a variety of related problems. Focusing on the upper-middle section, problems of inadequate burnup and increased production of high-level transuranic waste are of concern. Since the upper-middle section has a relatively low percentage of thermal neutrons, a higher concentration of fissile fuel is sometimes used to support a chain reaction. If the fuel bundle has a uniform fissile fuel distribution, this section could fall below criticality (the level required to sustain a chain reaction) before the other bundle sections. The fuel bundle would have to be replaced long before the fissile fuel in all sections of the bundle were depleted, wasting fuel.

The problem with waste disposal is further aggravated at this upper-middle section since the relatively high level of epithermal neutrons results in increased production of actinide-series elements such as neptunium, plutonium, americium, and curium, which end up as high level-waste.

One method of dealing with axial spectral variations is using a control rod. For the BWR, control rods typically extend into the core from below and contain neutron-absorbing material which robs the adjacent fuel of thermal neutrons which would otherwise be available for fissioning. Thus, control rods can be used to modify the distribution of thermal neutrons over axial position to achieve more complete burnups. However, control rods provide only a gross level of control over spectral density.

More precise compensation for spectral variations can be implemented using enrichment variation and burnable poisons. Enrichment variation using, for example, $U^{235}$ enriched uranium, can be used near the top of a fuel bundle to partially compensate for a localized lack of thermal neutrons. Similarly, burnable poisons such as gadolinium oxide ($Gd_2O_3$), can balance the exposure of bundle sections receiving a high thermal neutron flux. Over time, the burnable poisons are converted to isotopes which are not poisons so that more thermal neutrons become available for fissioning as the amount of fissile material decreases. In this way, fissioning can remain more constant over time in a section of the fuel bundle. By varying the amount of enrichment and burnable poisons by axial position along a bundle, longer and more complete burnups can be achieved. In addition, the enrichment and poison profiles can be varied by radial position to compensate for radial variations in thermal neutron density.

Nonetheless, taken together, the use of control rods, radial positional exchange of bundles, selective enrichment and distribution of burnable poisons still leave problems with axial variations in burn rates and neutron spectra. Furthermore, none of these employed methods effectively address the problem of the high level of fissile material produced and left in the upper-middle sections of the bundle due to the high level of epithermal neutrons and the low level of thermal neutrons. What is needed is a system that deals more effectively with axial spectral variations in neutron flux so that higher fuel burnups are provided and so that high-level waste is minimized.

OBJECTS OF THE INVENTION

A major objective of the present invention is to provide for more thorough fuel burnups to enhance fuel utilization and minimize active waste products.

Another object of the present invention is to provide a new and improved reactor effective for using axial variations in neutron flux density and in neutron spectral distribution for both converting fertile fuel to fissile fuel, and providing more uniform and complete fuel fissioning during the life of the fuel in the reactor core.

DISCLOSURE OF INVENTION

In accordance with the present invention, a nuclear reactor with a recirculating heat transfer fluid has a bi-level core which provides enhanced flexibility in fuel arrangement. The bi-level core includes two sets of fuel units, one set arranged on a first level, the other set arranged on a second level. Preferably, fuel units of the second level are arranged in vertical alignment with fuel units of the first level. This permits a fuel unit of the first level to be accessed by removing only the adjacent fuel unit of the second level. During refueling operations, fuel units can be shifted from one level to the other, providing additional flexibility in arranging units at various stages of burnup. Preferably, fuel units of the first level are inverted relative to the fuel units of the second level. The inversion provides for placing plenum sections of fuel rods in different levels away from each other so that the plenums do not introduce a discontinuity in neutron generation, and allows for more uniform axial fuel burnup. The bi-level core allows fuel to be initially positioned in the second level for conversion of fertile fuel to fissile fuel, and then repositioned to the first level for more complete axial burnup. In a preferred embodiment the first level boils water to generate saturated steam, and the second level is cooled by the saturated steam and generates superheated steam.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
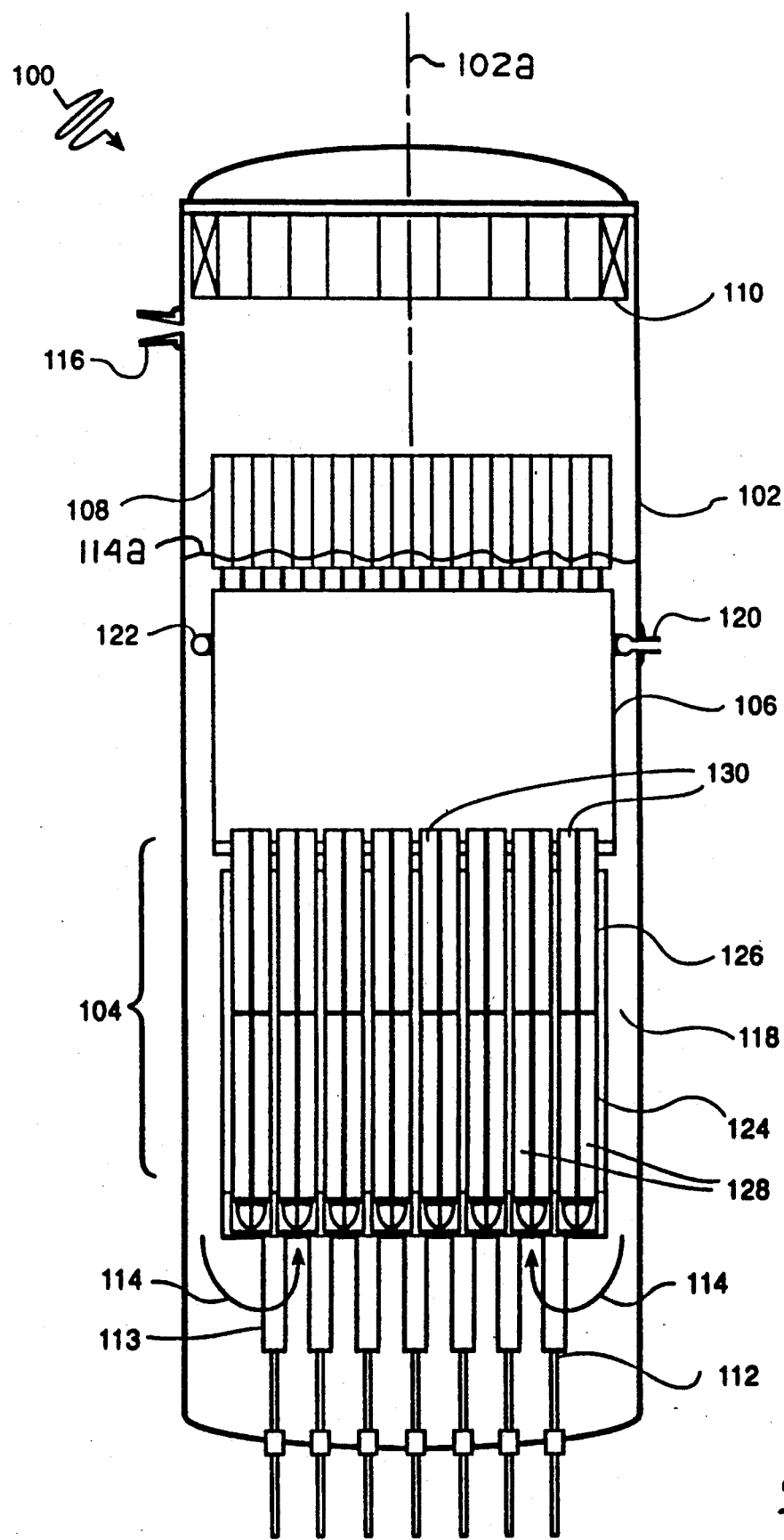
FIG. 1 is a schematic elevational sectional view of a reactor in accordance with one embodiment of the present invention.

As illustrated in FIG. 1, and in accordance with one embodiment of the present invention, a natural-circulation boiling-water reactor 100 comprises a pressure vessel 102, a core 104, a chimney 106, a steam separator 108, and a steam dryer 110. The vessel 102 has a longitudinal centerline axis 102a which defines an axial direction parallel thereto, and a radial direction perpendicular thereto, the axial direction being up relative to the ground and gravity. Control rod drive housings 112 extend through the bottom of vessel 102 and support neucontrol rod guide tubes 113. Control rod guide tubes 113 extend to the bottom of core 104 so that control blades therein can be inserted into the retracted from core 104 to control its power output.

Water 114 acts as a heat transfer fluid and flows, as indicated by the arrows, into core 104 from below. This subcooled water is boiled within core 104 to yield a water/steam mixture which rises through the chimney 106. Steam separator 108 helps separate steam from water, and the released steam is dispelled upwardly from a water/steam interface, or water level 114a and exits through a steam exit 116 near the top of vessel 102. Before exiting, any remaining water entrained in the steam is removed by dryer 110. The separated water is returned down peripheral downcomer 118 by the force of gravity due to density differences inside the chimney 106 and the downcomer 118. Recirculation of coolant may also be assisted by pumps located in the downcomer region, for example, using conventional jet pumps or reactor internal pumps. Feedwater enters through a feedwater inlet nozzle 120 and feedwater sparger 122 to replenish and to help cool the recirculating water in downcomer 118.

In the context of a boiling-water reactor, fuel bundles are arranged into upper and lower matrices. The fuel bundles share a common form factor so that each fuel bundle can be placed in any position in either matrix. During refueling operations net transfers are as follows: spent bundles are removed from the lower matrix, partially spent bundles from the upper matrix are inserted into the lower matrix, and fresh bundles are inserted into the upper matrix. This fuel bundle "flow" is an average flow and does not exclude the possibilities that some elements are retired from the upper matrix, some fresh fuel bundles are inserted into the lower matrix, and that some partially spent fuel bundles are transferred from the lower matrix to the upper matrix.

The fuel bundles can contain multiple fuel rods. Each fuel rod can include a plenum at one end where gaseous fission byproducts can accumulate. The plenum ends are preferably directed away from the interface between the upper and lower matrices. In other words, the plenums are up in the upper matrix and down in the lower matrix. Otherwise, at least one plenum would be positioned between the fuel in the same rod and the fuel in the corresponding rod in the other matrix. This would tend to introduce discontinuities in neutron generation and temperature. Separation of fuel in the upper and lower matrices is minimized by inverting the fuel bundles when they are moved from one matrix to the other.

Moreover, channel and core stability are enhanced using this inverted fuel bundle arrangement. Stable thermal hydraulic operation, that is, the propensity to damp stochastic disturbances in flow and void fraction, is promoted more effectively where there is a liquid water phase adjacent to the fuel rod plenum than where there is a combination of liquid and vapor phases. Relative to conventional one-level cores in which all plenums are near the top, the present invention provides greater stability since at least part of the plenum volume is at the core entrance where there are no steam voids and the overall two-phase flow pressure drop is reduced.

Due to heating by the core, the void fraction of the water increases at higher levels so that the steam void fraction is greater at the level of the upper matrix than it is at the level of the lower matrix. Accordingly, neutron moderation is more effective at the lower level than at the upper level. Because of the difference in moderation, fuel bundles in the upper matrix are subjected to a harder neutron spectrum than are the fuel bundles in the lower matrix.

The harder neutron spectrum can be taken advantage of by the fresh fuel bundles in the upper matrix. The harder neutron spectrum contains a higher percentage of fast and epithermal neutrons, while the thermal neutron spectrum contains a higher percentage of slower thermal neutrons. Thermal neutrons are more effective than faster neutrons at causing fission. The faster neutrons are more likely to be subjected to capture or resonance absorption reactions which do not result in fission.

Non-fissioning neutron absorption results in isotopic enhancement. In other words, the hard neutron spectrum converts fertile material to fissile fuel. The primary reaction is the absorption of a fast neutron by fertile $U^{238}$ to yield fissile $Pu^{239}$ through a relatively short lived radioactive decay chain. Neutron absorption by $Pu^{239}$ can result in fission or in the formation of the next plutonium isotope, fertile $Pu^{240}$. Neutron absorption by fertile $Pu^{240}$ results in a fissile $Pu^{241}$ isotope. The net effect of the hard neutron spectrum is production of additional fissile material as the original fissile material is partially spent. Furthermore, other transuranics which are formed through various nuclear reactions and radioactive decay chains have a good likelihood to fission in the hard spectrum, producing useful energy and minimizing high level, actinide-series waste products. Thus, the relatively hard neutron spectrum of the upper fuel matrix can be used to convert fertile fuel to fissile fuel and minimize waste poisons, enhancing the operational lifetime of a fuel bundle.

The harder neutron spectrum in the upper matrix is less effective in inducing fission. This is not a problem where relatively fresh fuel bundles in the upper matrix are fuel enriched to contain relatively high concentrations of fissile fuel, typically, $U^{235}$. As the $U^{235}$ is depleted faster than additional fissile fuel is created, the hard neutron spectrum would eventually be unable to support a chain reaction. Prior to this point, the no-longer-fresh fuel bundle can be transferred from the upper matrix to the lower matrix, which is exposed to a more thermal neutron spectrum.

Since thermal neutrons are most effective at inducing fission, fuel in the lower matrix can be more fully utilized. This provides advantages in fuel economics as well as waste disposal. Since the fuel in the lower matrix is subjected to a thermal spectrum, the ratio of capture and resonance absorption to fission reactions is less, resulting in less conversion of fertile materials and less high-level waste. Thus, isotopic enhancement, which might otherwise contribute to higher levels of radioactivity in the spent fuel elements, is minimized in the soft neutron spectrum of the lower matrix.

In preview, the present invention provides for enhanced fuel arrangement flexibility which can take advantage of axial neutron spectral shifts through the core. As a result, fuel lifetimes are increased and the quantity of high-level nuclear waste is minimized.

These and other features and advantages of the present invention are apparent in the following detailed description.

Figure 2:
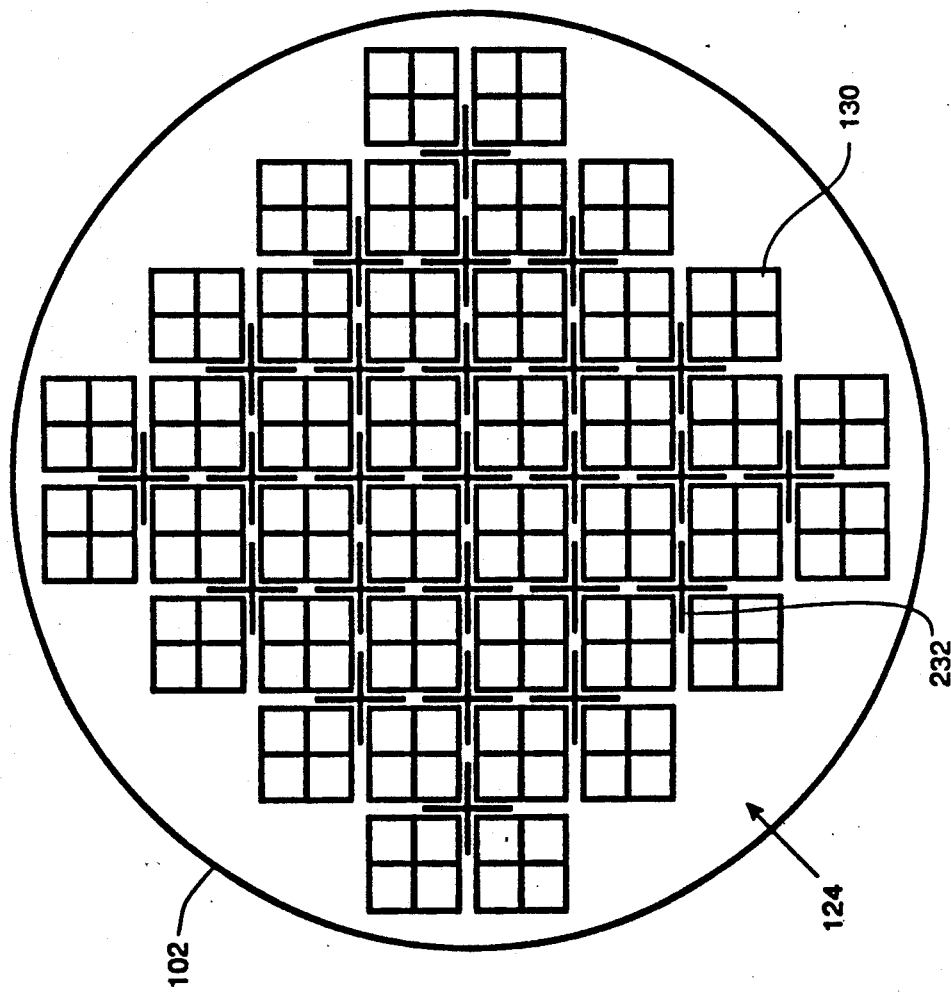
FIG. 2 is a schematic transverse sectional view of the upper core of the reactor of FIG. 1.
Figure 2A:
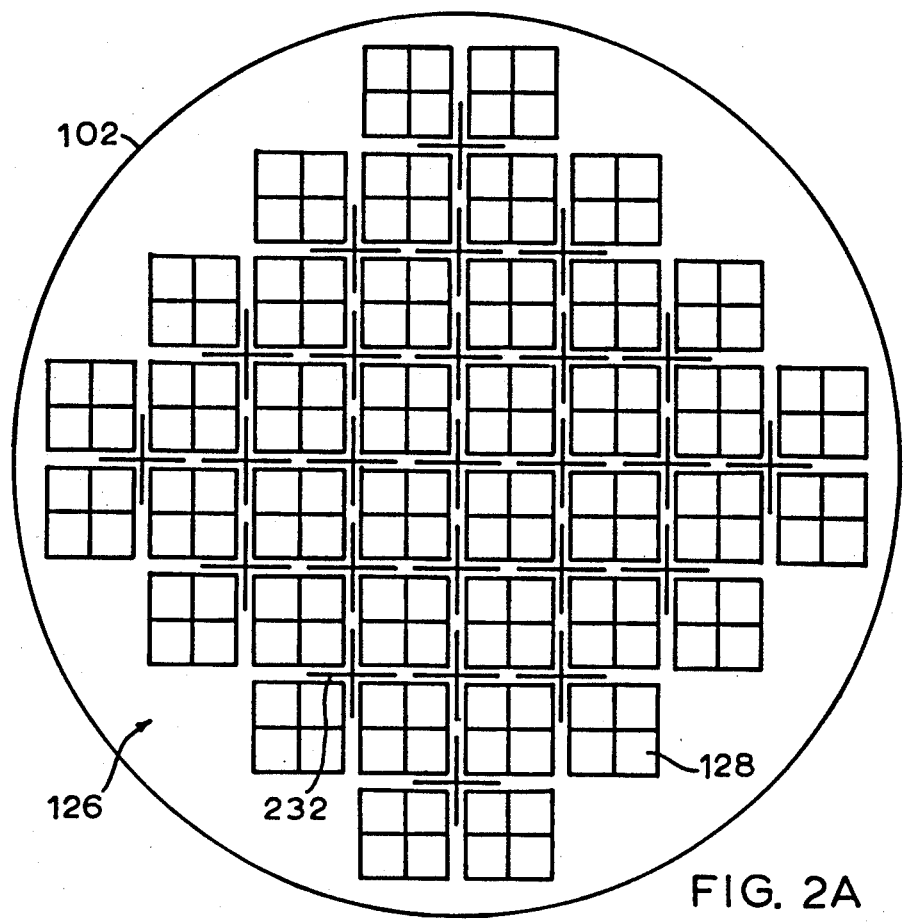
FIG. 2A is a schematic transverse sectional view of the lower core of the reactor of FIG. 1.
Figure 2B:
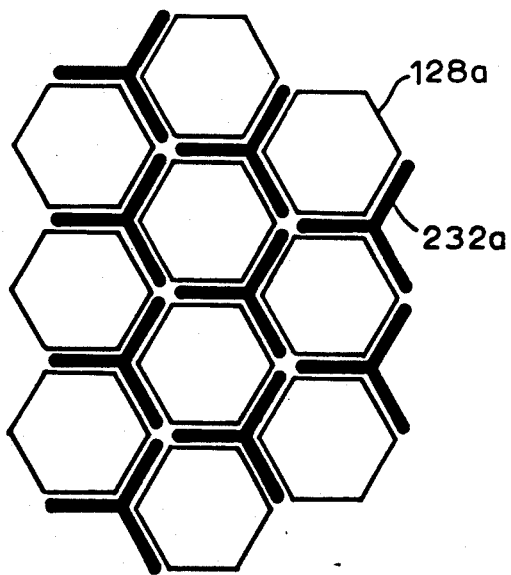
FIG. 2B is a schematic transverse sectional view of a portion of the upper core of the reactor illustrated in FIG. 1 having fuel bundles in accordance with another embodiment of the present invention.
Figure 2C:
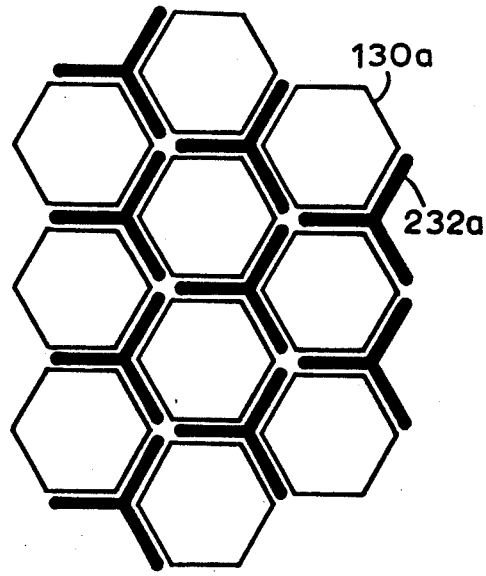
FIG. 2C is a schematic transverse sectional view of a portion of the lower core of the reactor illustrated in FIG. 1 having fuel bundles in accordance with another embodiment of the present invention.

The core 104 comprises a first or lower core 124, alternatively referred to as level, stage or fuel matrix 124, and a second or upper core 126, alternatively referred to as level, stage, or fuel matrix 126. Upper fuel matrix 126 is filled with upwardly oriented fuel units, or bundles, 130, and the lower fuel matrix 124 is filled with downwardly oriented fuel units, or bundles 128. Fuel bundles 128 of lower matrix 124 are arranged in a first two-dimensional array, as shown in FIG. 2. Fuel bundles 130 of upper matrix 126 are arranged in a similar, or identical, second two-dimensional array directly above, as shown in FIG. 2A. Spaces are left between groups of four fuel bundles for control rods 232 with cruciform cross sections to move vertically to regulate power output. The lower and upper fuel bundles 128 and 130 may have various lattice configurations such as square with the cruciform control rods 232 as illustrated in FIGS. 2 and 2A, or hexagonal as shown for the alternate lower and upper fuel bundles 128a and 130a shown in FIGS. 2B and 2C with Y-shaped control rods 232a.

Figure 3:
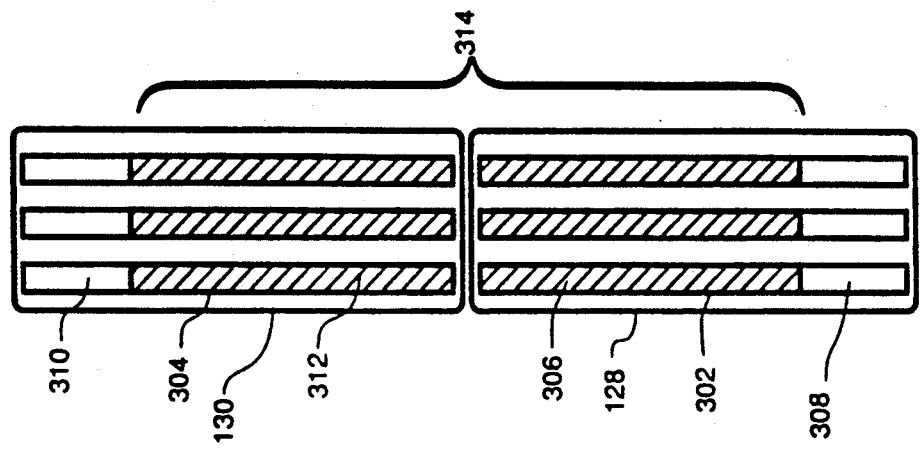
FIG. 3 is a schematic elevational view of a pair of fuel bundles in the reactor of FIG. 1.

The upper fuel bundles 130 are preferably stacked directly on the lower fuel bundles 128, as shown in FIG. 3. As schematically indicated in FIG. 3, each fuel bundle contains multiple fuel rods. The lower fuel bundle 128 includes lower fuel rods 302, and the upper fuel bundle 130 includes upper fuel rods 304. Each lower fuel rod 302 includes a fuel section 306, and a plenum 308 which leaves space for gaseous byproducts of fission reactions to accumulate. Otherwise, pressure buildup within a fuel rod could lead to a breach of the fuel rod cladding. Note that the fuel rods 302 are vertically oriented with their plenums 308 disposed below their fuel sections 306. Likewise, the upper fuel rods 304 are vertically oriented with their plenums 310 disposed above their fuel sections 312.

The inverted relationship of fuel bundles 128 and fuel bundles 130 thus defines a relatively continuous fuel section 314 between the lower plenums 308 and the upper plenums 310. This physical continuity provides a greater degree of thermal continuity and neutron flux continuity than would be provided if lower fuel bundles 128 were not inverted and a relatively large cap existed between the respective fuel sections 306 and 312. Relative to fuel rods in conventional one-level cores having a single plenum disposed above a fuel section in two-phase flow, or water/steam flow, there is less plenum space at the level with the two-phase flow. In particular, the core 104 provides half of its plenum space, i.e. plenums 308, near its entrance where almost all of the adjacent water is in the liquid phase, as shown by the water flow arrows 114 in FIG. 1, while only the other half of its plenum space, i.e., plenums 310, remains in the two-phase flow which contains a substantial portion of steam. Thus, the present invention provides that more plenum space is adjacent to a single-phase water flow region, enhancing channel and core stability.

The bi-level fuel bundle arrangement of the present invention provides additional flexibility in the redistribution of fuel bundles during refueling operations. In particular, an axial level as well as a radial array position can be selected for each fuel bundle. This provides for a refueling scheme in which fresh or low burnup fuel bundles are installed in upper matrix 126 where a harder neutron spectrum can convert fertile fuel to fissile fuel. Partially spent, or medium to high burnup, fuel bundles can be moved from upper matrix 126 to lower matrix 124 where the more thermal, or soft, neutron spectrum can more effectively utilize, or fission, the remaining fissile fuel. Fertile fuel conversion is minimized in the lower matrix due to the soft neutron spectrum so that a relatively complete burnup is possible while minimizing the quantity of high-level radioactive waste products in the lower fuel bundles.

Figure 4:
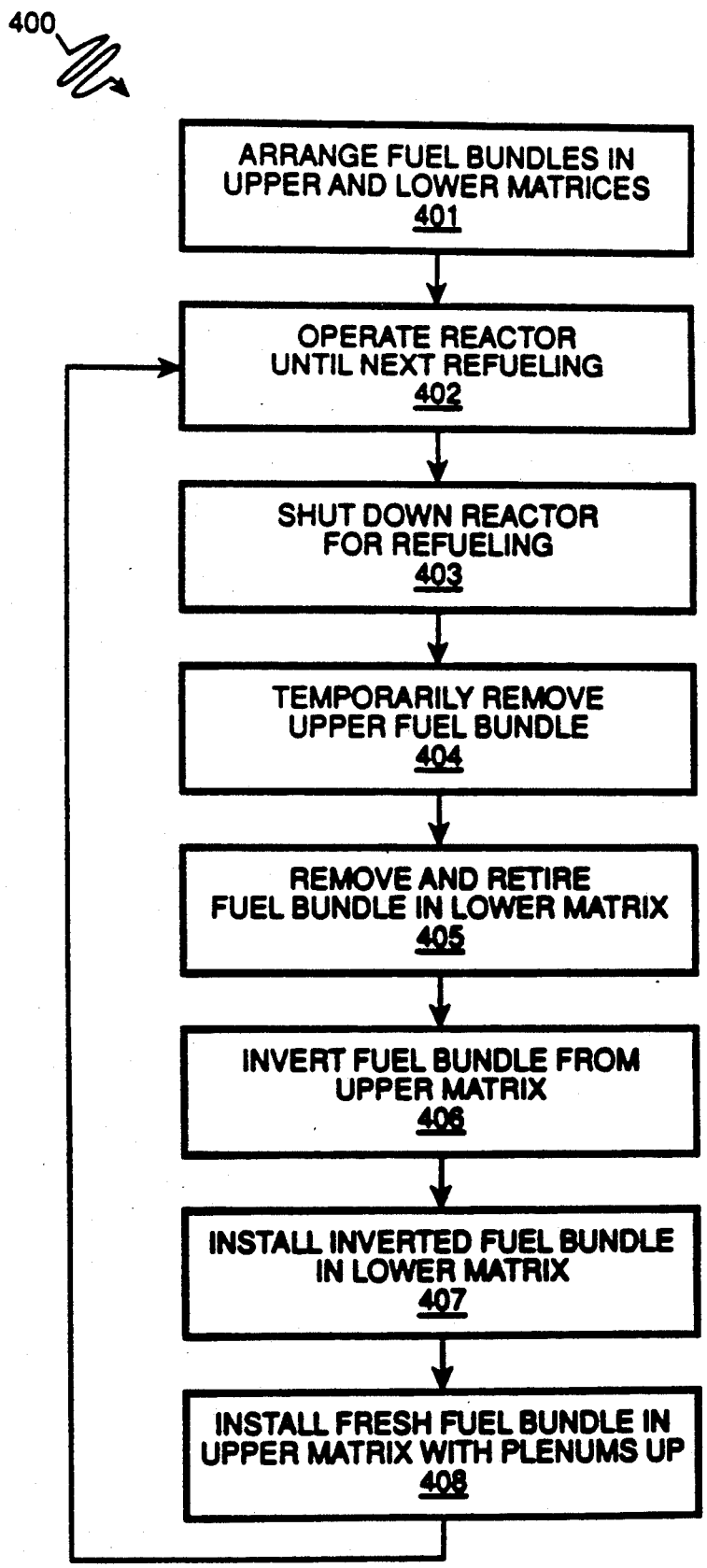
FIG. 4 is a flow chart of a method of arranging fuel elements in the reactor of FIG. 1 in accordance with the present invention.

More specifically, a preferred refueling method 400 in accordance with the present invention begins, at step 401, with the two-level arrangement of core 104, as indicated in FIG. 4. Reactor 100 is operated initially with all fresh fuel bundles, at step 402. Reactor 100 is shut down for refueling, as indicated in step 403.

Some or all fuel bundles in upper matrix 126 are removed, at step 404, and placed in temporary storage. Fuel bundles in lower matrix 124 are removed, at step 405, from vessel 102 and processed for disposal. The temporarily removed fuel bundles from upper matrix 126 are inverted, at step 406, and installed in lower matrix 124, at step 407. Fresh or low burnup fuel bundles are then installed, at step 408, plenum side up in upper matrix 126. Reactor 100 is then reactivated, reiterating method 400 beginning with step 402.

Fuel bundles in a conventional one-level core are typically subject to several burn cycles before being disposed. At each refueling outage, the bundles are redistributed radially in the matrix with those having less burnup being moved to alternate radial positions for obtaining more complete burnup in view of the radial variation in neutron flux density and spectral distribution. Once a fuel bundle is substantially burned, i.e. has undergone substantially complete fission, it is then retired from the core. Accordingly, the present invention allows for additional flexibility in fuel management by allowing axial, as well as radial, redistribution of fuel bundles. Fresh, or low burnup fuel is preferably provided in the core upper level 126, and medium to high burnup fuel is preferably provided in the core lower level 124. The low burnup fuel for the upper level 126 may come from radial redistribution within the upper level 126 itself, and the medium or high burnup fuel for the lower level 124 preferably comes form the upper level 126, with a portion thereof coming from radial redistribution of the lower level 124 as desired.

Method 400 can be applied to one pair of fuel bundles or to many at a time. The invention provides for repositioning a fuel bundle from top upper matrix 126 to the corresponding position in lower matrix 124. Alternatively, the fuel bundle can be positioned within the lower matrix 124 at a radial position other than the one under its original position in upper matrix 126.

Method 400 is adapted to the axial spectral shift in neutron flux due to boiling in the core of a boiling-water reactor. In such a reactor, method 400 characterizes a desired net flow of fuel bundles. It does not preclude the movement of bundles radially within a level, or the movement of fuel bundles from the lower matrix to the upper matrix. In addition, it does not preclude introducing fresh fuel bundles into a lower matrix or retiring fuel bundles from an upper matrix. The same considerations that led to radial shifting fuel bundles in conventional reactors apply to reactors with bi-level cores. The present invention provides additional, axial, flexibility in redistributing fuel.

The present invention provides for cores with two or more levels of fuel units, which can be monolithic or contain multiple elements. The bundles on a level can be packed as triangles, rectangles including squares, or hexagons. Other packing shapes are also provided for. Some embodiments employing control rods do not use them at all core levels. Power output regulation can be conventionally effected using burnable poisons, adjusting coolant flow and temperature, and/or using other power regulation approaches. Access to a lower core level can be through an upper core level, from the bottom, or through lateral access.

The advance provided by the present invention in core design and refueling procedure is best understood in the context of parallel advances in reactor design and operation, as described below.

The current state of the art in BWRs is split into two paths. The first path is that of the large forced-circulation boiling-water reactors (FCBWRs). The second path is represented by natural-circulation boiling-water reactors (NCBWRs).

The recent FCBWR represents a major improvement over previously existing plants because of its improved economics, enhanced safety, low maintenance, and low personnel exposure. In addition, its use of advanced control and instrumentation simplify construction and operation. The FCBWR also offers reduced construction cost per kilowatt, as well as reduced radioactive waste.

The NCBWR is designed to meet the objective of high simplicity and high inherent safety. It is also designed to meet a demand, by certain segments of the industry, for smaller plants.

Figure 1A:
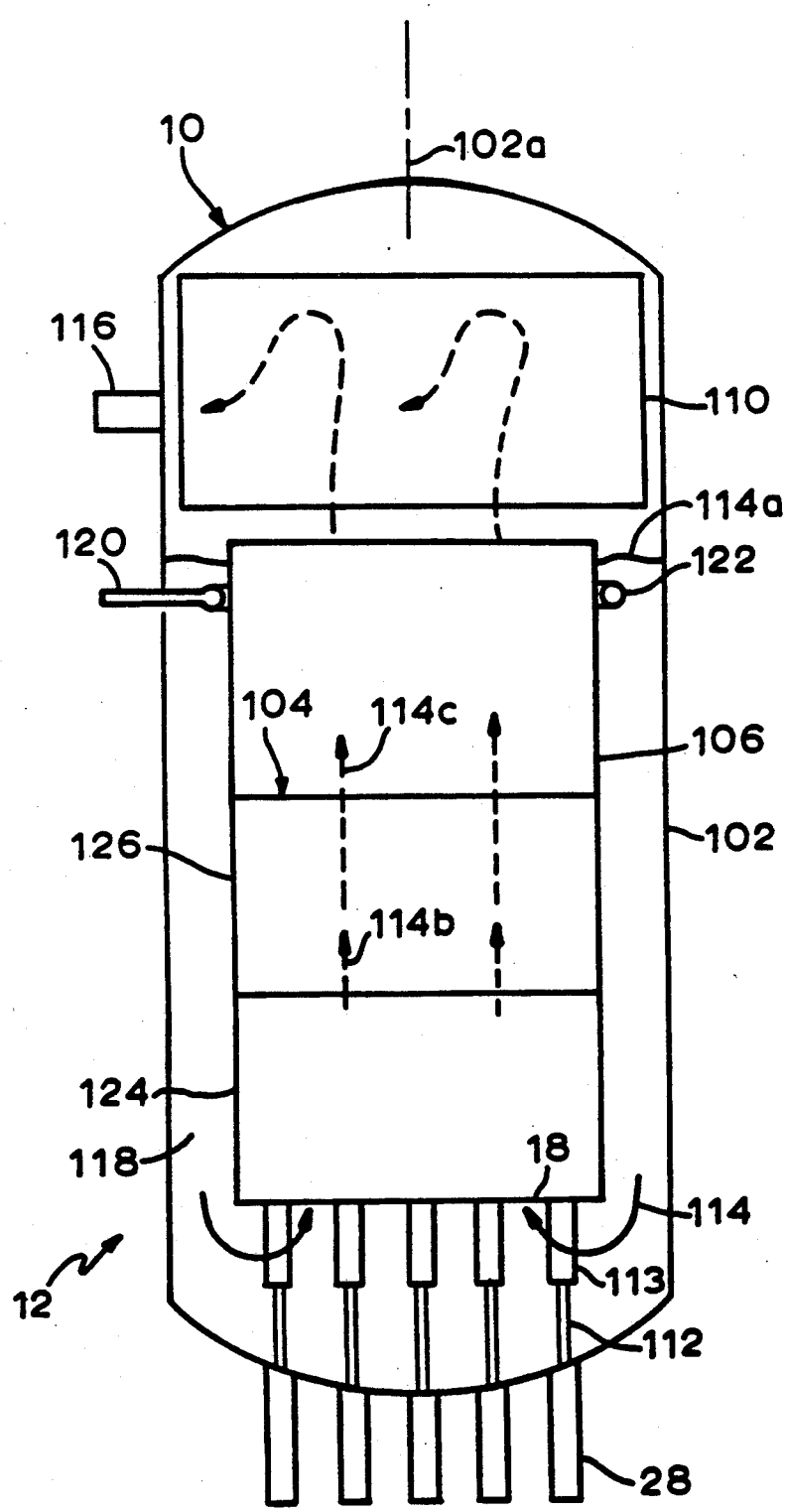
FIG. 1A is a schematic elevational sectional view of a reactor in accordance with another embodiment of the present invention.

The present invention not only provides improvements in FCBWRs and NCBWRs by utilizing the two-stage core described above, but also provides a third type of BWR, a steam-cooled boiling-water reactor (SCBWR) 10 with a two-stage core 104 as illustrated in FIG. 1A. The SCBWR 10 is generally identical to the two-stage BWR 100 described above, and enjoys the same advantages described above, but has differences in design which result in additional advantages including a simpler reactor with fewer components and increased thermal efficiency. The lower stage 124 is a conventional boiling water reactor core which converts the subcooled inlet water 114 to saturated steam 114b, for example, at about 7.0 MPa and about 217° C. The upper stage 126 is fed by the steam 114b from the lower stage 124 and converts it to superheated steam 114c, for example, at about 7.0 MPa and temperatures greater than about 271° C. The fuel bundle configuration or mechanical design for the two stages is preferably identical, and the upper stage 126 is loaded with fresh or low burnup fuel while the lower stage 124 is loaded with inverted fuel that has undergone at least one cycle of exposure in the upper stage as described above. After complete burnup operation in the lower stage 124, the fuel is discharged.

Comparing FIGS. 1 and 1A, the water level in the downcomer 118, indicated schematically at 114a, is generally the same and extends over both the lower core 124 and upper core 126. However, a substantial difference between the BWR 100 illustrated in FIG. 1 and the SCBWR 10 illustrated in FIG. 1A is that in the former, the water 114 continues to boil from the lower stage 124 and through the upper stage 126, whereas in the latter, boiling of the water 114 is substantially complete at the top of the lower stage 124, with steam (114b, 114c) being channeled through the upper stage 126. The water 114 enters the core 104 from the bottom in its liquid phase and is boiled by the lower stage 124 to generate the saturated steam 114b. The second level 126 is positioned directly on top of the first level 124 for receiving the saturated steam 114b being channeled thereto from the first level 124. The second level is cooled by the saturated steam 114b and, therefore, heats the saturated steam 114b for forming conventional superheated steam 114c.

Accordingly, the lower level 124 provides a compact steam input source for the steam cooled second level 126 without the need for complex and inefficient steam blowers and injectors to achieve steam circulation as found in conventional steam cooled reactor concepts. Neither is there a need for conventional contact boilers to provide the steam source. Although there is only one reactor core 104, there are two distinct axial stages, i.e., the lower level or boiling stage 124, and the upper level or steam cooled stage 126.

The SCBWR 10 illustrated in FIG. 1A includes circulating means 12 which are substantially similar to the circulation means illustrated in FIG. 1 for circulating the water 114 axially through the core 104 form the first level 124 toward and through the second level 126. The circulation means 12 includes the downcomer 118 and the core 104 which provide a natural recirculation of the water 114 by gravity due to density differences in the water which flows downwardly in the downcomer 118 and upwardly in the core lower level 124 and, optionally, conventional pumping means such as jet pumps or reactor internal pumps to further assist recirculation. The conventional feedwater sparger 122 is located above the upper stage 126 and below the water level 114a in the downcomer 118 for providing feedwater in the downcomer 118 as is similarly done in the FIG. 1 embodiment.

The movement of fuel from the upper to the lower stage has several advantages. It initially maximizes in the upper, or converter, stage 126 the conversion ratio of fertile $U^{238}$ and $Pu^{240}$ by resonance capture in the hard neutron spectrum, isotopically enhancing the fertile fuel to fissile fuel $Pu^{239}$ and $Pu^{241}$. Subsequently, it maximizes in the lower, or burner, stage 124 burnout of the Pu in the thermal spectrum of the boiling stage, while limiting conversion of $U^{238}$ near the end of bundle life. Furthermore, maximum flexibility is provided for achieving power distribution shaping by means of increased fuel enrichment in the upper stage 126, which is not wasted since remaining fuel from the upper stage 126 is subsequently burned in the lower stage 124, and by means of burnable poisons in the lower stage 124 to reduce burnup in the lower stage to better match the burnup in the upper stage 126 for obtaining a more uniform axial burnup in the core 104.

With uranium fuel, the upper stage effects relatively high conversion with a nuclear lifetime of about 150,000 megawatt day per metric tonne (MDW/Tonne) being attainable. With plutonium fuel, the upper stage 126 can be deigned to bread fuel, with a nuclear lifetime of about 200,000 MWD/Tonne being attainable. In either case, high conversion is achieved and significant reductions in the generation of high-level waste is realized by first burning in the upper stage, the subsequently burning in the lower stage. This offers the advantage of recycling the converted fertile fuel from the upper stage to the lower stage, and burnup in the lower stage of significant quantities of remaining high level wastes which did not fission during its residence in the upper stage, without having to conventionally chemically reprocess the fuel.

There are significant additional advantages to the SCBWR 10 having the bi-level core 104 over the BWR 100 also having a bi-level core. For example, since the upper level 126 is used for forming the superheated steam 114c, the conventional steam separator 108 illustrated in FIG. 1 is not required in the SCBWR 10, which is, therefore, characterized by the absence of such a steam separator disposed above the core upper level 126. The core upper level 126 is effective for producing the superheated steam 114c with substantially little water, in its liquid phase, remaining therein. However, the conventional steam dryer 110 may be used in the SCBWR 10 for removing what little, if any, water remains in the superheated steam 114c.

Similarly, the lower and upper fuel bundles 128 and 130 of the SCBWR 10 also have two dimensional radial arrays which may be in the form illustrated in FIGS. 2 and 2A. Furthermore, each of the upper fuel bundles 130 is also preferably disposed directly above a respective lower fuel bundle 128 in the SCBWR 10 as illustrated in FIG. 3. The preferred orientation of the fuel sections 306 and 312, and of the plenums 308 and 310 as shown in FIG. 3 are also preferred in the SCBWR 10.

Referring again to FIG. 1A, it should be appreciated that the reactor core 104 has a neutron spectrum from the bottom of the lower stage 124 to the top of the upper stage 126 which is varying from relatively soft to hard. As indicated above, axial variation in both neutron flux density and neutron spectrum occurs from boiling the water 114 and creating void fractions. However, in the SCBRW 10 illustrated in FIG. 1A, boiling is substantially complete at the top end of the lower stage 14, and, therefore, the axial variation in the lower stage 124 is substantially greater when compared to the axial variation in the entire core 104 illustrated for the BWR 100 illustrated in FIG. 1, which has a longer axial boiling length. Since the saturated steam 114b is channeled upwardly through the upper stage 126 and undergoes superheating, the neutron spectrum therein is relatively hard and substantially harder than that found in the BWR 100 illustrated in FIG. 1.

Accordingly, the SCBWR 10 may take advantage of this increased axial variation in neutron spectrum, with the resulting hard neutron spectrum in the upper stage 126, to provide an increased amount of fertile fuel conversion to fissile fuel. The upper stage 126 may then be considered a converter stage, and as mentioned above, with plutonium used as a fuel, the upper stage 126 can be designed to breed fuel, i.e., generate more usable fuel than it consumes.

Accordingly, the upper fuel bundles 130 of the upper stage 126 preferably include fertile fuel which forms fissile fuel by conversion due to the hard neutron spectrum. And, the lower fuel bundles 128 in the lower stage 124 preferably include fissile fuel which is fissionable due to the soft neutron spectrum found in the lower stage 124.

Furthermore, in an embodiment where the fuel pellets form the lower and upper fuel bundles 128, 130 are reprocessed for separating and collecting those containing substantial amounts of actinide-series elements, such fuel pellets may be placed into the upper fuel bundles 130 for being exposed to the hard neutron flux to fission and produce useful energy while further decreasing the high-level wastes associated therewith.

The method described above and illustrated in FIG. 4 is equally applicable to the SCBWR 10 illustrated in FIG. 1A, with the lower stage 124 including preburned, or medium to high burnup, fuel bundles previously disposed in the upper stage 126 which have undergone at least some conversion from the fertile fuel to fissile fuel. These preburned fuel bundles 128 in the lower stage 124 then undergo additional fission or burnup in the lower stage 124 until they are suitably completely exhausted, after which time they may be discharged from the reactor.

In order to more easily redistribute the upper fuel bundles 130 into the lower stage 124 for use as the lower fuel bundles 128, the upper and lower fuel bundles 128 and 130 are preferably identical in configuration having the same height and lattice arrangement.

Figure 5:
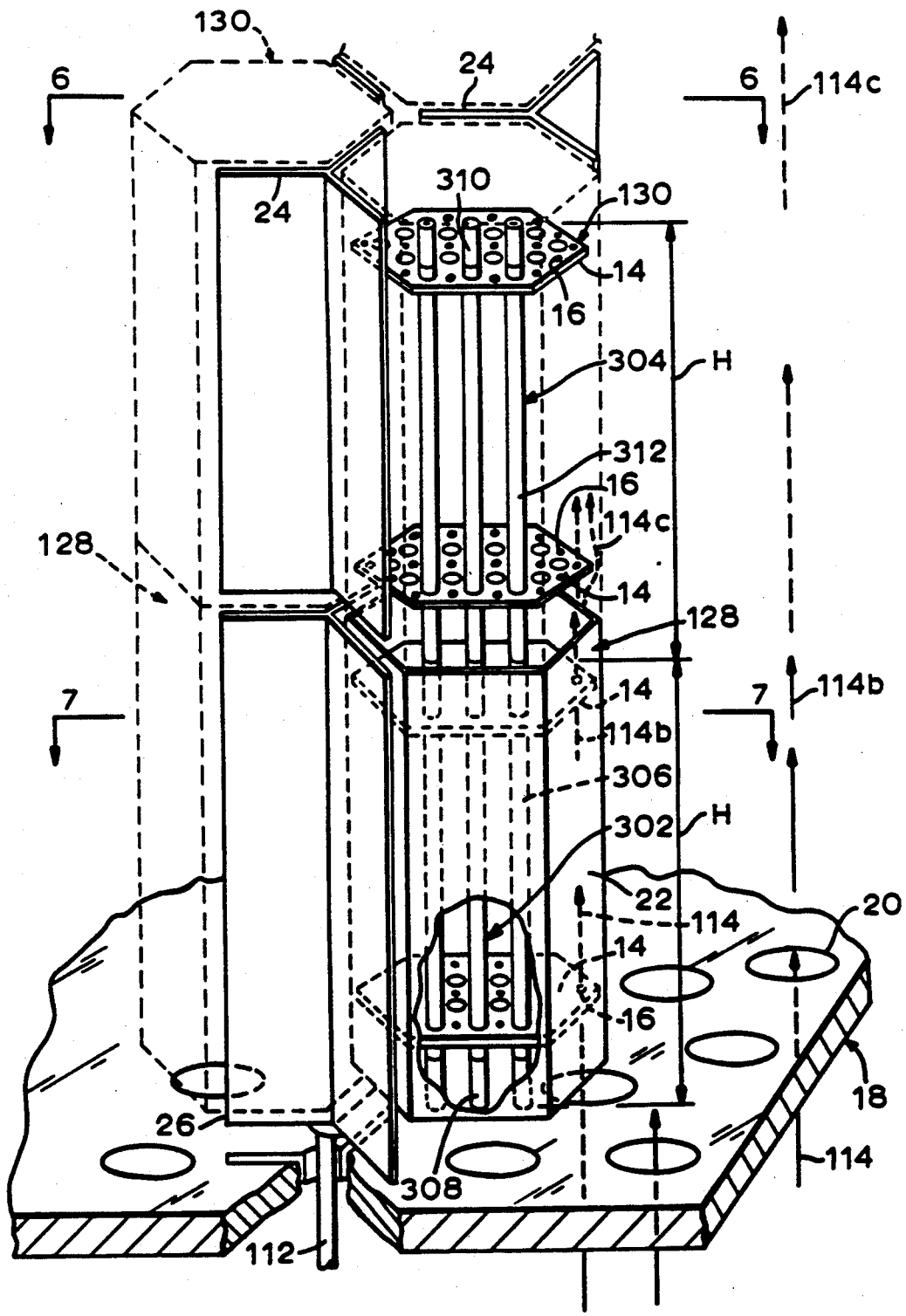
FIG. 5 is a schematic perspective representation of two exemplary fuel bundles of the upper and lower cores of the reactor illustrated in FIG. 1A in accordance with an exemplary embodiment of the present invention.

More specifically, illustrated in FIG. 5 is an exemplary configuration of the lower and upper fuel bundles 128 and 130 in a hexagonal lattice. The lower and upper fuel rods 302 and 304 (only three of each being shown for clarity of presentation) are preferably arranged in a hexagonal configuration and spatially joined together in the transverse, or radial plane, by a pair of axially spaced apart tie plates 14. Each of the tie plates 14 includes a respective aperture through which a respective fuel rod 302, 304 is positioned, along with additional flow apertures 16 (only a few of which are shown for clarity of presentation) through which the core water 114, the saturated steam 114b, and the superheated steam 114c flow, respectively.

Accordingly, each of the lower and upper fuel bundles 128 and 130 are identical and have an identical radial configuration, e.g., hexagonal, and identical axial height H so that individual ones of the upper fuel bundles 130 may be simply axially redistributed into the lower stage 124 to replace one of the lower fuel bundles 128. When this redistribution is accomplished, the upper fuel bundle 130 is disposed in the lower stage 124 in an inverted position as shown in both FIGS. 3 and in FIG. 5.

This is a significant advantage of the present invention since the preburned upper fuel bundles 130 may be moved from the upper stage 126, subject to the hard neutron spectrum, to the lower stage 124, subject to the soft neutron spectrum, wherein they may be more fully and completely burned. In this way, when the upper fuel bundles 128 are initially positioned in the upper stage 126 they may be provided with more fuel enrichment for obtaining a more uniform axial power distribution from the entire core 104 without wasting such enriched fuel as would occur in a conventional single level reactor wherein such enriched fuel could not practically be reutilized. But, in accordance with the present invention, the upper fuel bundles 130 may be recycled in to the lower stage 124 for more complete burning.

Furthermore, since the neutron spectrum varies from soft to hard in the axial upward direction, the fuel in the upper fuel section 312 is burned to different degrees in the axial direction. By inverting the upper fuel bundle 130 and then placing it into the lower stage 124, the fuel section 312 may then be more uniformly axially burned. And, as described above, the respective fuel sections 306 and 312 are disposed closely adjacent to each other for providing a minimum gap therebetween which therefore provides a minimum affect on the neutron spectrum. And, since two plenums 308 and 310 are used, the lower plenum 308 when disposed in the inverted position in the lower fuel bundle 128 is disposed in substantially only single phase water 114 and extends vertically upwardly therein for providing enhanced thermal hydraulic stability.

As illustrated in FIG. 5, the lower fuel bundles 128 may be simply supported on a lower stationary support plate 18 at the bottom of the lower stage 124, which support plate 18 has a plurality of flow channels 20 extending axially therethrough. These flow channels 20 allow the water 114 to circulate upwardly through the lower stage 124 and provide the water 114 between adjacent fuel bundles and within individual fuel bundles.

Since water, or a water/steam mixture is not being channeled past the upper fuel bundles 130, conventionally required flow channels or baffles are not required, and, therefore, the upper fuel rods 304 may be disposed directly in contact with the saturated steam 114b which is allowed to flow freely between adjacent fuel rods 304 of adjacent upper fuel bundles 130. However, since the water 114 flows upwardly over the lower fuel bundles 128, suitable flow channels or baffles are still required for controlling the flow thereof.

More specifically, in one embodiment of the present invention, a preferably hexagonal flow baffle 22 is provided around each of the lower fuel bundles 128 for their entire axial length. Each of the lower fuel bundles 128 is therefore disposed in a respective one of the baffles 22 which channel through the baffle 22 and over the fuel rods 302 a portion of the water 114 for forming the saturated steam 114b. Each of the flow baffles 22 may be permanently attached to the lower support plate 18 so that the lower and upper fuel bundles 128 and 130 may remain identical in configuration, and, upon axial redistribution thereof, one of the lower fuel bundles 128 may be removed from within its baffle 22 and replaced by an inverted one of the upper fuel bundles 130. The tie plates 14 are preferably complementary in shape, i.e., hexagonal, so that they fit within the baffles 22. Alternatively, the baffles 22 may be provided as separate components in which the lower fuel bundles 130 are laced prior to being positioned in the lower stage 124 above the support plate 18.

However, it is preferred that each of the upper fuel bundles 130 is disposed directly over a respective one of the lower fuel bundles 128 for receiving the saturated steam 114b therefrom for forming the superheated steam 114c.

The upper stage 126 preferably includes a plurality of stationary poison curtains 24 disposed between adjacent ones of the upper fuel bundles 130, and a plurality of axially movable control rods 26 disposed between adjacent ones of the lower fuel bundles 128, and, more specifically, between adjacent ones of the flow baffles 22. Since hexagonal fuel bundles 128 and 130 are preferred, the poison curtains 24 and the control rods 26 each have a Y-configuration, as additionally shown in FIGS. 6 and 7. However, the fuel bundles 128 and 130 can have other types of configurations including, for example, the square configuration illustrated in FIGS. 2 and 2A with the poison curtains 24 and the control rods 26 then having cruciform configurations, with the control rod 26 being substantially identical in cross-section to the control rod 232 illustrated in FIG. 2. Depending upon the particular configuration of the poison curtains 24, they may be suitably fixedly supported to the tie plates 14 or any other convenient stationary component of the upper stage 126.

The poison curtains 24 preferably contain boron and, at a design point for the superheated steam 141c formed in the upper stage 126, the poison curtains 24 are essentially transparent to the hard neutron spectrum and allow the upper stage 126 to remain critical. However, at off-design points wherein the upper stage 126 is in a flooded state or wherein the density of the superheated steam 114c is below the density at the design point, the poison curtains 24 contribute to automatically cause the upper stage 126 to become subcritical. In the flooded state wherein the water 114 would rise into the upper stage 126, the boron in the poison curtains 24 is effective for absorbing neutrons for decreasing reactivity of the upper core 126. Alternatively, in the low density off-design point, the upper fuel bundles 130 have a preferred configuration for increasing fast neutron leakage which will decrease reactivity of the upper core 126 to become subcritical.

Figure 7:
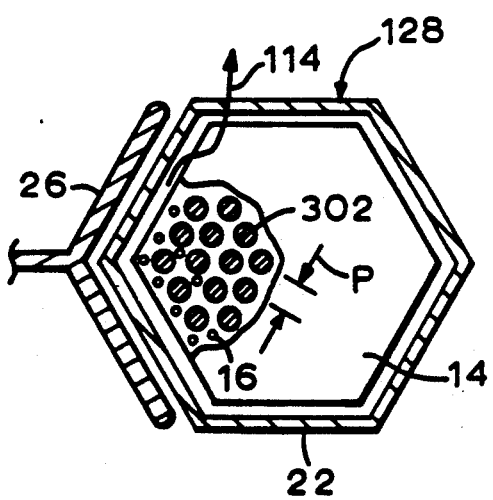
FIG. 7 is a schematic, transverse sectional view of one of the lower fuel bundles and portion of an adjacent control rod in the lower stage illustrated in FIG. 5 taken along line 7—7.
Figure 8:
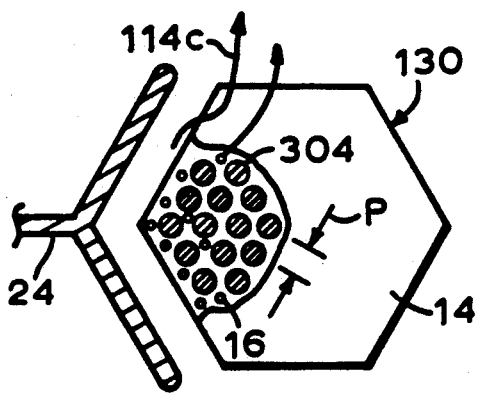
FIG. 8 is a schematic, transverse sectional view of one of the upper fuel bundles and portion of adjacent poison curtain illustrated in FIG. 5.

More specifically, the configuration of the upper fuel bundles 130, as well as of the lower fuel bundles 128, as illustrated in more particularity in FIGS. 7 and 8, include a triangular configuration of adjacent fuel rods 304 having a pitch P which is tighter than that found in conventional boiling water reactors, and the diameters of the fuel rods 304 is also smaller than is found in conventional boiling water reactors. For example, the outer diameter of the upper fuel rods 304 may be about 8.0 mm, with the outer diameter of the conventional fuel pellets therein being about 6.28 mm. And, the pitch P may be about 12.0 mm. The configuration of the lower fuel rods 302 is preferably identical to that of the upper fuel rods 304.

Inherent safety is achieved by the incorporation of the poison curtains 24. The poison curtains contain a material, such as boron, to prevent an insertion of positive reactivity if the upper stage is flooded. Boron is essentially transparent to the fast flux of a hard neutron spectrum, but when the upper stage is flooded with water, the spectra becomes thermal and the boron becomes a strong neutron absorber (poison). On the other hand, as the amount of superheat increases, the power also reduces due to neutron leakage and there is a strong negative power coefficient. Thus, if the operating point shifts too much to either side of the design point, the power is reduced automatically.

Because of the inherent characteristics of the upper stage 126, the control rods 26 may be used only in the lower stage 124, although, in alternate embodiments, they could also be used in the upper stage 126. Accordingly, the control rods 26 can be about half the length of conventional control rods which would be used in a single level core of comparable output power, and, therefore, less axial space is required for mounting the control rods 26, including the guide tubes 113 shown in FIG. 1A. Similarly, conventional control rod drives 28 may also be shorter than would otherwise be required since the control rods 26 are relatively short.

Furthermore, the channels or flow baffles 22 are used only in the lower, boiling, stage 124. The shorter channeled length allows higher power density to be achieved within established stability design limits. Stability is also improved by the inversion of the fuel, since the fission gas plenum volume is in the subcooled single phase rather than the two-phase region.

Figure 6:
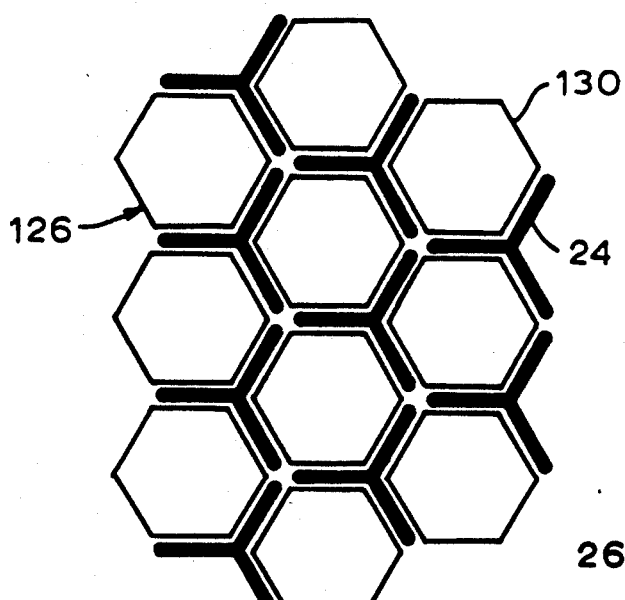
FIG. 6 is a schematic top view of the upper core packing arrangement of upper bundles illustrated in FIG. 5 taken along line 6—6.

In the upper stage 126 shown in FIG. 6, the fuel bundles 130 are configured hexagonally with Y-shaped upper stage poison curtains 24. The total bi-level core length is approximately 3 meters (m) with only the lower half needing the control rods 26, so the vessel length can be shortened relative to comparable FCBWR designs. With the use of a 7 m diameter vessel, an output of 1800 megawatts electric (MWe) is contemplated.

High enrichments on the order of 15% in the upper core 126 are used to achieve long fuel cycles and high power density. The use of conventional burnable poisons allows the economical use of such enrichment without requiring the use of an excessive number of control elements or rods. Burnable poison will also be used to control power shape both axially and radially. The refueling interval can be three years.

The fuel is configured for efficient generation and burning of recycled plutonium. The bundle and core are designed so that the fuel is placed in a hard neutron spectrum (high steam void fraction which approaches unity in the superheated steam 114c) early in its exposure history and a soft neutron spectrum (low steam void fraction) late in its exposure history. This spectrum shift assists plutonium production and fissioning of produced actinides early in life and plutonium burnup late in life.

Fuel for the SCBWR 10 may be uranium dioxide or mixed oxide ($UO_2$ or $PuO_2$) pellets enclosed in a stainless steel, inconel or other suitable cladding. Stainless steel is preferred due to its improved thermal capability and long fuel rod life relative to zircaloy clad used in conventional BWRs, and due to its lower absorption of newtrons in a thermal spectrum relative to alternate materials such as inconel. The individual fuel rods 302 and 304 are bundled together preferably in the shape of the hexagonal lattice described above. The two bundles 128 and 130 are preferably stacked, one on top of the other, in the core 104, providing an active fuel length of about 3 meters (1.5 m per bundle) with an additional half meter allowance for plenum volume and fuel rod expansion at the bottom and the top of the lower and upper bundles 128 and 130, respectively.

The lower bundle 128 is preferably surrounded by the hexagonal flow baffle 22 in order to provide flexibility through orificing to optimize flow distributions for the boiling region. Channeling is eliminated for the upper fuel bundles 130 since a high quality steam mixture 114b enters from the boiling stage 124. This provides increased margin for stable operation, in conjunction with the short fuel bundle length, for the high power-density core 104. A total of 268 upper and lower fuel bundles 126 and 128 and 201 control rods 26 is contemplated for the 1800 MWe plant design.

In the SCBWR 10, the enrichment requirements are reduced relative to conventionally described steam cooled reactors due to the efficiency of the boiling stage 124 to burn converted fuel midway through its lifetime. Accordingly, in one embodiment, fresh fuel would be placed in the upper stage 126 to be exposed to the hard neutron spectrum for about 75,000 MWD/Tonne. At the next refueling, this fuel would be moved to the lower stage 124, where it would be burned in the soft neutron spectrum for another 75,000 MWD/Tonne.

Although the enrichment requirements may be higher than existing BWR plants, burnup is also substantially higher. Furthermore, the SCBWR 10 tends to represent the ultimate in spectral shift capability for a BWR, and may be enhanced by providing excess flow to sweep voids from the boiling stage 124, while depressing power production from the converted stage 126 with lower quality steam for a suitable portion of the operating cycle time.

The differences in fissile inventory between an upper fuel bundle 130 in the upper stage 126, and a lower fuel bundle 128 in the lower stage 124 has additional benefits in shaping a uniform power distribution. However, it is preferred that the upper fuel rods 304 will have a conventional wire wrap to enhance heat transfer when first loaded into the steam cooled upper stage 126. Further shaping of power distribution may be achieved by suitable positioning of the bottom entry control rods 26, or recirculation flow adjustments.

The core 104 of the SCBWR 10 can operate at about 7 MPa, or higher. For a core 104 with an equivalent diameter of about 6 meters, a height of about 3 meters, and a power density increase of about 20% relative to conventional BWRs, a total thermal power of about 5,000 MW or more may be generated. The core 104 can easily fit within a reactor pressure vessel 102 of about 7 meters diameter. Since the stroke of the control rods 26 is half the 3 meter core height, and since the high quality steam 114c potentially eliminates the need for conventional steam separators, and perhaps dryers, the vessel 102 may have a height of approximately 7 meters shorter than typical BWRs.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A nuclear reactor comprising:
  a reactor vessel having a longitudinal centerline axis extending upwardly relative to gravity;
  a reactor core having a first level and a second level, said first level having a first set of fuel units arranged in a first two-dimensional array, said second level having a second set of fuel units arranged in a second two-dimensional array, each fuel unit of said second set being disposed directly above a fuel unit of said first set;
  circulation means for circulating a heat transfer fluid axially through said core from said first level toward said second level;
  said heat transfer fluid being initially in the form of water, and said first level being configured for boiling said water to generate saturated steam, said saturated steam being channeled upwardly to said second level; and
  said second level being configured for receiving said saturated steam from said first level for cooling said second level and heating said saturated steam for forming superheated steam.

2. A nuclear reactor according to claim 1 wherein each of said fuel units is a fuel bundle containing vertically extending fuel rods, each of said fuel rods having a fuel section containing fissile fuel and a plenum section for accumulating gaseous fission byproducts, said fuel rods in fuel bundles of said first set having first plenum sections below their fuel sections, said fuel rods in fuel bundles of said second set having second plenum sections above their fuel sections.

3. A nuclear reactor according to claim 2 wherein:
  said reactor core has a neutron spectrum from said first level to said second level varying from relatively soft to hard, respectively;

said second set of fuel bundles includes fertile fuel which forms fissile fuel by conversion due to said hard neutron spectrum; and said first set of fuel bundles includes fissile fuel which is fissionable due to said soft neutron spectrum.

4. A nuclear reactor according to claim 3 wherein said first set of fuel bundles includes preburned fuel bundles previously disposed in said second set which have undergone said conversion for forming fissile fuel, said preburned fuel bundles undergoing additional burning in said first level.

5. A nuclear reactor according to claim 4 wherein said preburned fuel bundles previously disposed in said second set are disposed in said first set in an inverted position.

6. A nuclear reactor according to claim 5 wherein said first plenums are disposed in said water and extend vertically upwardly therein.

7. A nuclear reactor according to claim 6 wherein said fuel bundles of said first and second sets are identical in configuration.

8. A nuclear reactor according to claim 3 wherein:
each of said lower and upper fuel bundles includes said respective fuel rods spatially joined together by a pair of axially spaced apart tie plates;
each of said lower fuel bundles being disposed in a flow baffle which channels through said baffle and over said fuel rods a portion of said water for forming said saturated steam; and
each of said upper fuel bundles being disposed over a respective one of said lower fuel bundles for receiving said saturated steam and forming said superheated steam.

9. A nuclear reactor according to claim 8 wherein said flow baffles are disposed solely around said lower fuel bundles and not around said upper fuel bundles.

10. A nuclear reactor according to claim 8 further including:
a plurality of stationary poison curtains disposed between adjacent ones of said upper fuel bundles; and
a plurality of axially movable control rods disposed between adjacent ones of said lower fuel bundles.

11. A nuclear reactor according to claim 10 wherein:
at a design point for said superheated steam formed in said core second level, said poison curtains are essentially transparent to said hard neutron spectrum and allow said core second level to remain critical; and at off-design points wherein said core second level is in a flooded state or density of said superheated steam is below density at said design point, said poison curtains automatically cause said core second level to become subcritical.

12. A nuclear reactor according to claim 11 wherein said poison curtains contain boron and in said flooded state are effective for absorbing neutrons.

13. A nuclear reactor according to claim 12 wherein said upper fuel bundles have a configuration for increasing fast neutron leakage at said off-design points below said design point steam density.

14. A nuclear reactor according to claim 13 wherein said upper fuel bundle configuration includes a tighter pitch and smaller fuel rod diameter than in a conventional boiling water reactor.

15. A nuclear reactor according to claim 14 wherein said lower and upper fuel bundles are each configured in a hexagonal configuration.

16. A nuclear reactor according to claim 15 wherein said lower and upper fuel bundles are identical in configuration including having the same axial length.

17. A nuclear reactor according to claim 16 wherein said first set of fuel bundles includes preburned fuel bundles previously disposed in said second set which have undergone said conversion for forming fissile fuel, said preburned fuel bundles undergoing additional burning in said first level.

18. A nuclear reactor according to claim 17 wherein said preburned fuel bundles previously disposed in said second set are disposed in said first set in an inverted position.

19. A nuclear reactor according to claim 18 further characterized by the absence of a steam separator disposed above said core second level, said core second level being effective for providing said superheated steam with substantially little water therein.

20. A nuclear reactor according to claim 3 further characterized by the absence of a steam separator disposed above said core second level, said core second level being effective for providing said superheated steam with substantially little water therein.

* * * * *